US005140173A

United States Patent [19]

Chau et al.

[11] Patent Number: 5,140,173

[45] Date of Patent: Aug. 18, 1992

[54] MICROPROCESSOR CONTROLLED DOOR HOLDER

[75] Inventors: Phong B. Chau; Raymond G. Benson, Jr., both of Indianapolis, Ind.

[73] Assignee: Motus, Inc., Indianapolis, Ind.

[21] Appl. No.: 603,532

[22] Filed: Oct. 25, 1990

[51] Int. Cl.[5] .................... H02J 1/00

[52] U.S. Cl. .................... 307/125; 49/31; 49/379; 307/154; 292/278

[58] Field of Search .............. 292/201, 270, 273, 278; 49/30, 31, 379, 394; 16/48.5; 307/112, 116, 125, 139, 149, 154

[56] References Cited

U.S. PATENT DOCUMENTS

| | | | |
|---|---|---|---|
| 3,534,499 | 10/1970 | Chafee | 49/31 |
| 3,729,771 | 5/1973 | Crane et al. | 49/31 |
| 3,771,823 | 11/1973 | Sehnarr | 16/48.5 |
| 3,905,063 | 9/1975 | Coulter et al. | 16/48.5 |
| 4,040,143 | 8/1977 | Lasier | 16/48.5 |
| 4,069,544 | 1/1978 | D'Hooge | 16/48.5 |
| 4,426,639 | 1/1984 | Jessup | 49/30 |
| 5,044,680 | 9/1991 | Baker et al. | 49/31 |

*Primary Examiner*—Jeffrey A. Gaffin
*Attorney, Agent, or Firm*—Baker & Daniels

[57] ABSTRACT

The invention comprises a method for operating a door hold-open device and a device for carrying out the method. A door hold-open device which unlatches a held door based upon the occurrence of an unlatch condition includes a door latching mechanism, a signal processing circuit having a power source. The method consists of the steps preventing the signal processing mechanism from consuming electrical current, upon occurrence of an unlatch condition, generating a unlatch condition signal and providing electrical current to the signal processing mechanism to power it, determining the continued existence of the unlatch condition signal with the signal processing mechanism and upon determination of the continued existence of the unlatch condition signal with the signal processing mechanism, transmitting an electrical unlatch signal to the door latching mechanism. A device capable of carrying out these steps includes door latching mechanism, a signal processing circuit such as a microprocessor having data input and output ports, a power source mechanism, the data output port being operatively connected to the door latching mechanism to enable unlatching of the door latching mechanism, a switch mechanism for selectively providing an electrical power supply to the signal processing circuit power source, and an unlatch condition signal mechanism connected to the signal processing mechanism data input port and to the switch mechanism, whereby upon generation of an unlatch condition signal, the switch mechanism provides power to the power source of the signal processing mechanism.

26 Claims, 4 Drawing Sheets

MICROPROCESSOR CONTROLLED DOOR HOLDER

FIELD OF THE INVENTION

This invention relates to door holders that automatically release a held-open door upon a predetermined event, such as the detection of smoke, and in particular, to such devices that are powered by a local power source such as a battery.

BACKGROUND OF THE INVENTION

Many releasable door hold-open devices are known in the art for automatically releasing a held-open door when a predetermined condition is detected, such as the existence of smoke or heat. These devices are often used with fire doors, which must be closed in the event of a fire to inhibit spreading of the fire.

Most prior devices employ a solenoid that must be continually energized to hold open the door. Representative examples of such devices are disclosed in representative U.S. Pat. Nos. 3,729,771, 3,771,823, 3,905,063 and 4,040,143. When smoke or heat is detected, or if current to the device is interrupted, the solenoid is de-energized, thus automatically releasing the door and allowing it to close under the force of a door closer. This implementation has the distinct disadvantage of requiring the electric actuator to be continuously energized to hold the door in the open position. A continuously energized actuator draws a large continuous electrical current, which wastes electricity, decreases the life of the actuator and makes battery operation impractical. Other shortcomings of door hold-open devices employing remote power sources include the expense and complication of providing wiring to the devices and the necessity of resetting multiple devices after an alarm condition.

Door hold-open devices that employ a local power source, such as a battery, can solve many of the foregoing problems. However, battery-powered door hold-open devices suffer from the shortcoming of having a short battery life. This is due to the constant current which must be used to monitor for an unlatch condition, as well as the larger current which must be used to actuate the motor or solenoid in the latching mechanism. For example, the door hold-open device disclosed in U.S. Pat. No. 5,072,973, which is incorporated herein by reference, can be actuated about 500 times before the battery becomes inoperative. Accordingly, it is desirable to provide a door holder with a means for minimizing power consumption during inactive periods.

OBJECTS OF THE INVENTION

One object of the invention is to provide an automatically releasable door hold-open device that does not require a continuous current be provided to the latching mechanism to hold-open a door.

Another object of the invention is to provide an automatically releasable door hold-open device that does not require special wiring to the building in which the device is installed.

Another object of the invention is to provide an automatically releasable door hold-open device that can be powered by a battery.

Another object of the invention is to provide an automatically releasable door hold-open device that consumes a minimum amount of current.

Another object of the invention is to provide a door hold-open device that will release a door when the battery's voltage drops below a predetermined threshold, or when the battery is removed.

Another object of the invention is to provide a door hold-open device that utilizes a servo motor actuated by a modulated signal.

Another object of the invention is to provide a door hold-open device that utilizes a microprocessor and a microprocessor de-energization circuit.

Still other objects and advantages of the invention will become apparent to those of skill in the art after reading the following description of a preferred embodiment.

SUMMARY OF THE INVENTION

The invention comprises a method for operating a door hold-open device and a device for carrying out the method. A door hold-open device which unlatches a held door based upon the occurrence of an unlatch condition includes a door latching means, a signal processing means having data input means, data output means, and a power source means, the data output means being operatively connected to the door latching means. The method consists of the steps preventing the signal processing means from consuming electrical current, upon occurrence of an unlatch condition, generating a unlatch condition signal and providing electrical current to the signal processing means to power it, determining the continued existence of the unlatch condition signal with the signal processing means and upon determination of the continued existence of the unlatch condition signal with the signal processing means, transmitting an electrical unlatch signal to the door latching means. A device capable of carrying out these steps includes door latching means, a signal processing means such as a microprocessor having data input means, data output means, and a power source means, the data output means being operatively connected to the door latching means to enable unlatching of the door latching means, switch means for selectively providing an electrical power supply to the signal processing means power source means, and unlatch condition signal means connected to the signal processing means data input means and to the switch means, whereby upon generation of an unlatch condition signal, the switch means provides power to the power source of the signal processing means.

DESCRIPTION OF THE PREFERRED EMBODIMENT

Figure 1:
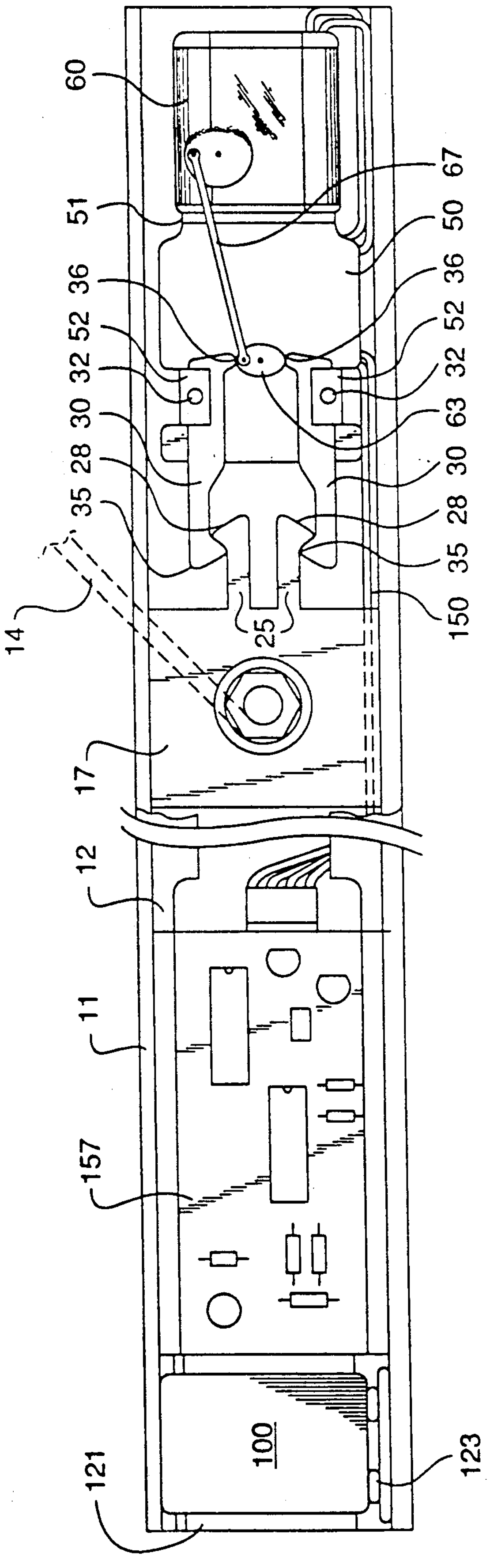
FIG. 1 is a top partial section showing a door holder in a latched position.

Referring to FIG. 1, in the preferred embodiment, the device of the invention includes elongate housing generally designated as 11. Housing 11 includes track 12 along which reciprocating member 17 may slide. Reciprocating member 17 receives rod 14, and also translates the degree of the door's open or closed position to a point along the rectilinear path of track 12. It should be understood that the preferred embodiment of the present invention is intended to be used with a door having a separate door closer (not shown) which continuously urges the door toward a closed position. However, it is within the scope of the invention to integrate a door closer component within the housing used for the present hold-open device.

Reciprocating member 17 has two resilient fingers which extend toward pivotable latch arms 30 and serve as latch arm receiving means. These fingers may comprise nylon or plastic, or any other material which is somewhat stiff yet resilient. The end of each finger contains an outward protrusion. The edge of each protrusion closest to the center of reciprocating member 17 is a convex arc with a radius of ⅛ inch. The arc swings out from the outside of fingers 25. The tips of fingers 25 comprise 45′ protrusions 28.

Figure 2:
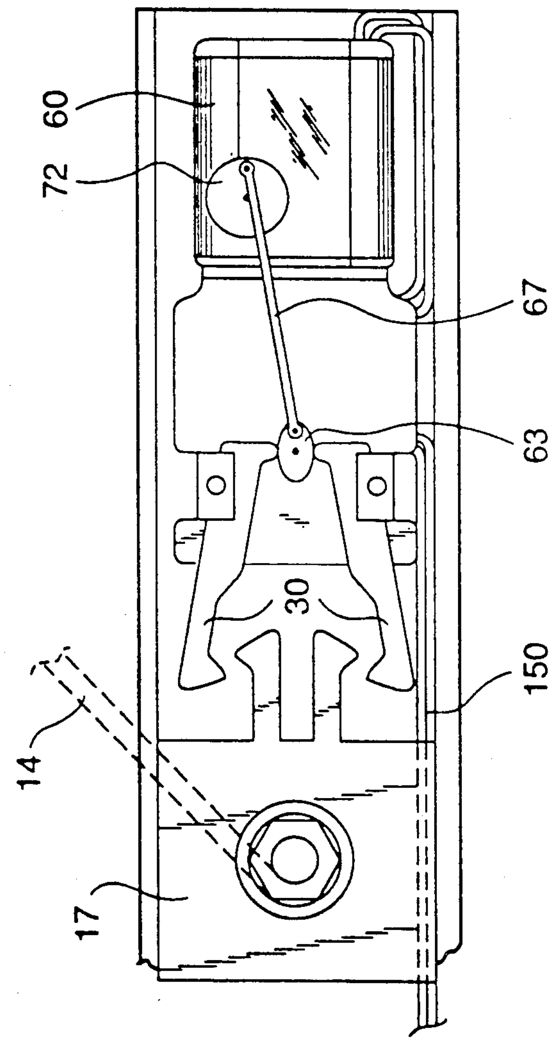
FIG. 2 is a top partial section showing a door holder in an unlatched position.

As the door moves from a closed to an open position, rod 14 translates the door's movement to reciprocating member 17 which moves from the unlatched position shown in FIG. 2 to the latched position shown in FIG. 1. Fingers 25 are positioned to engage latch arms 30 and thereby keep reciprocating member 17 in a hold-open position. The latching mechanism is operated by servo motor 60 connected to a battery 100 through electronic circuity described in detail below.

The door latching means includes a pair of latch arms 30 pivotally mounted on base 50 by pins 32. Base 50 is formed from a single piece of sheet metal, and includes flanges 52 which extend upward and partially cover latch arms 30. Pins 32 each extend from flanges 52, through arms 30, and into base 50. The pivot point of each latch arm is such that when the latching mechanism is in the unlatched position, as shown in FIG. 2, the protrusions of arms 30 are separated by a distance greater than the width of fingers 25. The ends of latch arms 30 closest to reciprocating member 17 contain inward protrusions 35. Protrusions 35 are defined by a concave arc with a radius of ⅛ inch, and mate with the protrusions of fingers 25. The inside of protrusions 35 include ramps at an angle of 45 degrees from the outside of latch arms 30. The tips of latch arms 30 are rounded. The ends of latch arms 30 opposite the latching ends contain small inwardly-facing posterior protrusions 36.

Servo motor 60, which in the preferred embodiment comprises a 94102 servo controller manufactured by Sanwa Electronic Instrument Company of Singapore and distributed by Airtronics, Inc., is mounted in housing 11. Servo motor 60 rotates disc 72 by an amount determined by a modulated signal as described below. Disc 72 is connected by linkage arm 67 to elliptical cam 63. When disc 72 is in the position shown in FIG. 1, linkage arm forces cam 63 toward a latched position. When disc 72 rotates 90° to the position shown in FIG. 2, linkage arm 67 forces elliptical cam 63 into an unlatched position. Precise rotation of the disc 72 by servo motor 60 is achieved by modulating the signals to servo motor 60 as described below.

When servo motor 60 is energized to move disc 72 and elliptical cam 63 into an unlatched position, latch arms 30 are able to move freely. With elliptical cam 63 rotated so its widest portion engages posterior protrusions 36 as shown in FIG. 1, a door may be latched open. This is accomplished by opening the door, thus forcing reciprocating member 17 toward motor 60, until fingers 25 reach latch arms 30. At that point, a slight additional opening force must be applied to the door to force resilient fingers 25 toward each other and between latch arms 30. Once the protrusions 26 on resilient fingers 25 have passed protrusions 35 of latch arms 30, reciprocating member 17 will be latched as shown in FIG. 1. This results in holding the door open until elliptical cam 63 is rotated 90°, allowing latch arms 30 to pivot freely. At this point, the bias of door closer (not shown) will begin to close the door, moving reciprocating member 17 away from motor 60. This motion will cause fingers 25 to push latch arms 30 outward, unlatching reciprocating member 17.

Even when the hold-open device is in its latched position as shown in FIG. 1, the door may be closed by manually applying a closing force to the door sufficient to cause resilient fingers 25 to cam slightly inward as reciprocating element 17 moves away from DC motor 60. Once fingers 25 are beyond the protrusions therein, the door will continue to close under the bias of the door closer (not shown).

A primary feature of the present invention is that a signal processing means such as a microprocessor having data input (A2, -A3) and output (B2, B3 and B6) means and a power source means (VCC) is utilized to generate the modulated current necessary to drive servo motor 60, and circuitry is utilized to prevent the microprocessor from consuming power until a separate circuit detects an event which may indicate an unlatch condition. The term "signal processing means" is defined to mean a means for converting the electric waveform of an unlatch condition signal into a waveform capable of actuating the unlatch mechanism. Thus, the microprocessor conserves energy by requiring minimal power consumption during normal operation.

Figure 3:
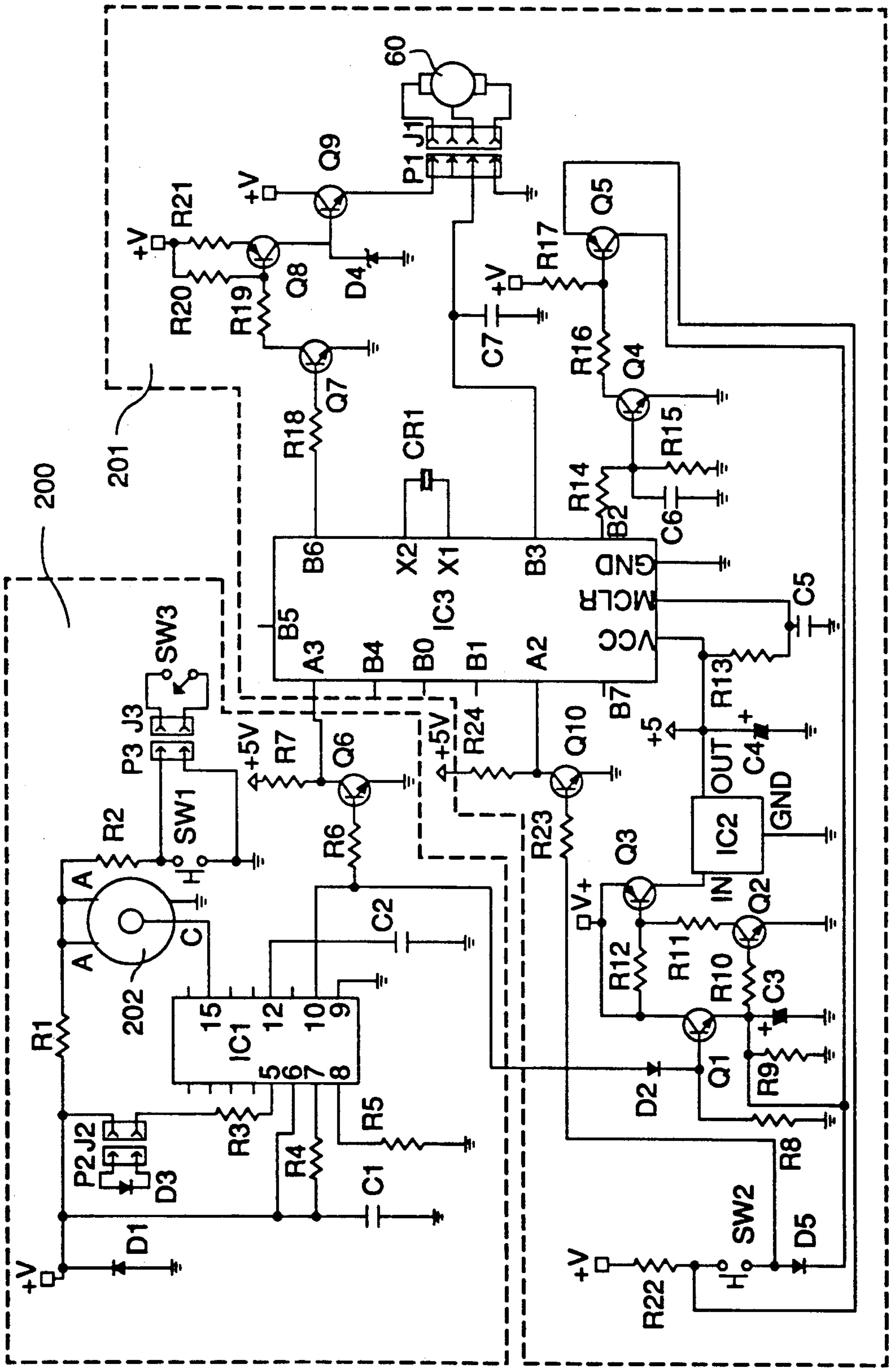
FIG. 3 is a circuit diagram of the door holder of one embodiment of the invention.

Referring to FIG. 3, the circuit of the preferred embodiment of the present invention can be divided into two general sections, namely, a unlatch condition detection circuit generally designated as 200, and a servo/controller circuit genrally designated as 201. The unlatch detection circuit generates an unlatch signal under any of four occurrences, namely the detection of smoke, a low battery condition, the depression of a test button, or the tripping of a switch indicating that the power source (battery) may be disconnected, the latter occurrence being more fully described in U.S. Pat. No. 5,044,680, which is incorporated herein by reference. The circuit has three general modes: (1) standby mode, in which the circuit is "waiting" for an unlatch condition to occur; (2) unlatch mode, in which the circuit causes servo motor 60 to be moved into an unlatched position; and (3) reset mode, in which servo motor 60 is moved from an unlatched into a latched position. The circuit is powered by a standard 9 volt transistor battery 100.

Servo/Controller Circuit Section.

Standby Condition. During the standby condition output pin 10 (FIG. 3) of smoke detector integrated circuit IC1 remains low. Since this output is low, transistors Q1, Q2, and Q3 are off; therefore no power is applied to 5 v regulator IC2 (LM78LO5) and in turn no power is applied to microprocessor IC3 (Microchip PIC 16C54), servo motor 60, or its driver transistors Q7, Q8 and Q9. This condition, in which microprocessor is prevented from consuming electrical current, results in extremely low standby current drain for maximum battery life.

Unlatch Condition. An unlatch condition causes the circuit to enter an unlatch mode. An unlatch condition may be depression of test switch SW1, accessing the battery to actuate switch SW3, detection of smoke by smoke sensor 202, or the detection of a low battery condition by IC1, any of which causes a high pulse from output pin 10 of smoke detector integrated circuit IC1 (Motorola 14467-1). This pulse signal turns on transistor Q1, which in turn activates transistors Q2 and Q3. Transistor Q3 applies power to 5v regulator IC2 which then provides electrical current to microprocessor IC3. Within the first 20 milliseconds, microprocessor IC3 acts partially as a switch and enables its output port B2 (pin #8). Port B2 turns on transistors Q4 and Q5 to latch power on to microprocessor IC3. During this time, the signal from the smoke detector, (IC1, pin #10) is also buffered and inverted by transistor Q6 and applied to input port A3 of microprocessor IC3. After port B2 (pin #8) has been enabled, microprocessor IC3 examines input ports A3 and A2 (pins #2 and #1 respectively) to determine the continued existence of the unlatch condition signal. (Port A2 is active only when the reset button is depressed—see Reset Condition below). When an unlatch condition signal is detected at port A3 (pin #2), microprocessor IC3 enables output port B6 (pin #12). Enabling port B6 turns on transistors Q7, Q8, and Q9 to supply power to servo motor 60. Microprocessor IC3 then sends pulse signals of the proper width from port B3 (pin #9) to servo motor 60 to cause the latch to be released. Once servo motor 60 has rotated 90° to its proper position to release the door, microprocessor IC3 disables ports B6 and B2 (pins #12 and #8 respectively) to conserve battery power. No further action is taken until the pulse signal present at pin #10 of IC1 ceases and returns.

Reset Condition. A reset condition occurs when reset switch SW2 is depressed, which applies power to transistor Q2. This in turn activates Q3 which applies power to the 5 v regulator IC2. IC2 in turn supplies power to microprocessor IC3. After power is applied to microprocessor IC3, within 20 milliseconds, its output port B2 (pin #8) is enabled. This then turns on transistors Q4 and Q5 to maintain power applied to itself. Microprocessor IC3 then immediately checks for activity at port A3 and A2 respectively. If no activity (high condition) is present at port A3 (pin #2), which indicates an unlatch condition, then port A2 (pin #1) is checked. Port A2 should be "0" indicating that reset button SW2 is depressed. The reset button must be depressed for a time period of greater than 250 milliseconds for the reset function to be activated. This "0" at port A2 will cause microprocessor IC3 to enable port B6 (pin #12) which supplies power to servo motor 60 through transistors Q7, Q8 and Q9. Port B3 (pin #9) will then output the correct pulse width signal to cause servo motor 60 to move into a latched position. Once this has been completed, microprocessor will disable ports B6, B2 and B3 to thereby power-down and conserve battery power. No further activity will take place until reset switch SW2 is again depressed (in which case servo motor 60 will not move) or an unlatch condition occurs (IC1 pin #10 becomes high.) If for some reason reset switch SW2 was depressed for less than 250 milliseconds, the processor will monitor ports A3 and A2 for 50 seconds. If no activity is detected during that time period, the processor will shut itself off and the system will revert to the standby mode.

Unlatch Detection Circuit.

Standby Mode. In standby mode, smoke detector chip IC1 internally powers itself and checks for the presence of smoke every 1.67 seconds. This is accomplished by comparing the voltage at pin #15 against a reference voltage. If no smoke is detected, IC1 will power itself down to conserve battery power. Additionally, the LED D3 will be turned on for 10 milliseconds every 40 seconds. During the ON time of the LED, the battery supply voltage is compared to a reference voltage to determine if a low battery condition exists.

Unlatch Condition. When either test switch SW3 is depressed or the battery access door switch SW3 is tripped, the voltage at pin #15 of IC1 will be forced below the reference voltage required to determine the presence of smoke. Pin #10 of IC1 will then output an unlatch condition signal in the form of pulses as long as either of these conditions exists. These pulses will then cause controller/servo circuit 201 to release the door latch, as described above. If smoke enters the smoke sensor 202, the conductivity between point A and ground of the smoke sensor is changed. This change results in a voltage drop, at pin #15 of IC1, which is again compared against the voltage reference and results in opening the door latch as described above. When a low battery condition is detected by IC1, a 10 millisecond pulse is present at pin #10 of smoke detector IC1 every 40 seconds. The first pulse will cause controller circuit 201 to "wake up" from its standby condition and wait for 50 seconds for the next pulse. The next pulse will cause servo motor 60 to move to an unlatched position. The circuit will then revert to standby mode.

Figure 4:
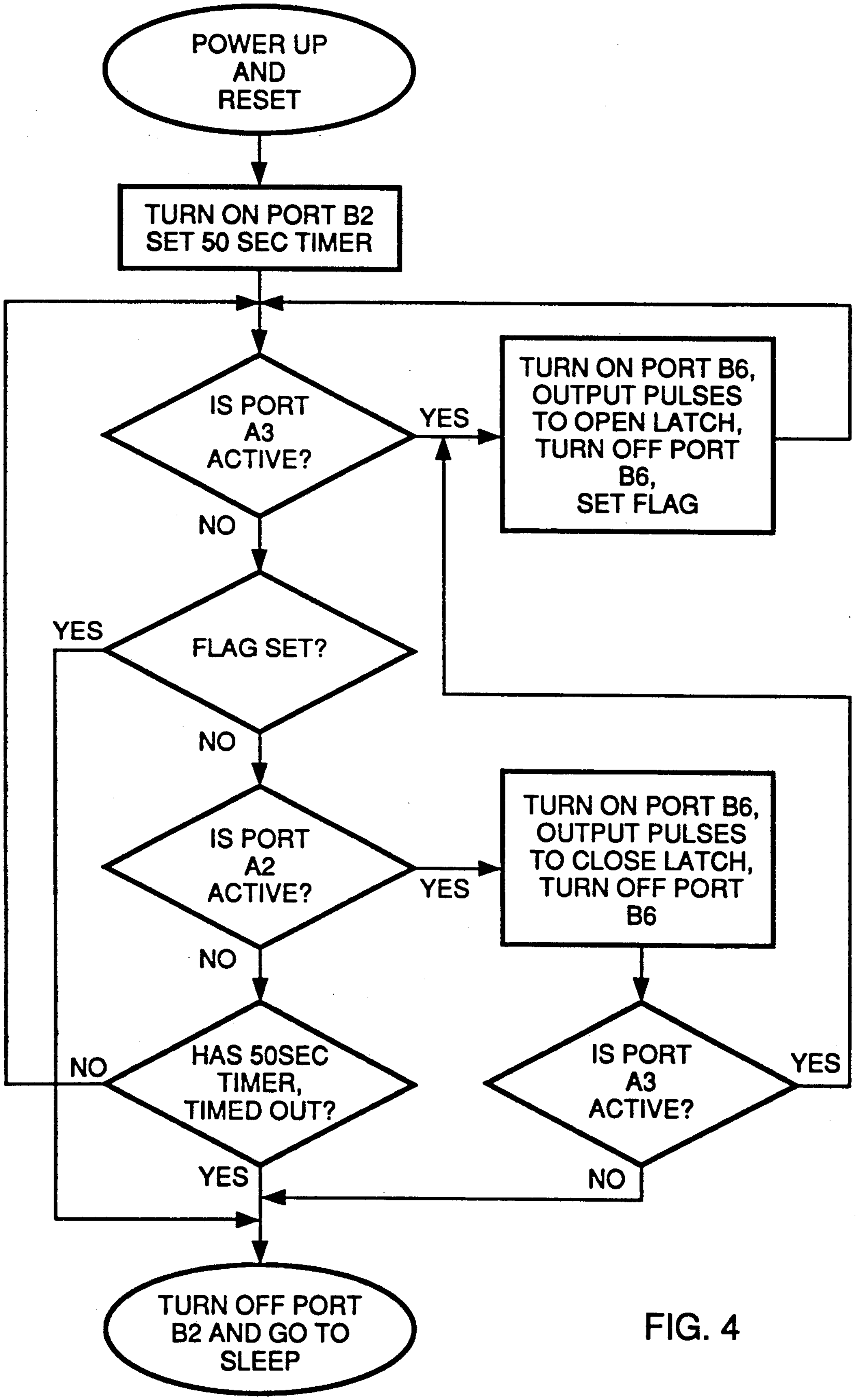
FIG. 4 is a flowchart for the software of the microprocessor of the door holder.

A flowchart for the software used by the microprocessor appears in FIG. 4. As discussed above, microprocessor IC3 receives no power when in standby condition. However, when power is initially applied to microprocessor IC3 as a result of an unlatch condition signal, microprocessor IC3 generates a high signal out of its output port B2, which, as described above, activates a circuit switch to maintain power to microprocessor IC3. Microprocessor IC3 also checks an internal clock time as a time reference, then checks port A3, which is the unlatch condition signal input port. If an unlatch condition signal is still present at port A3, microprocessor IC3 generates a series of modulated output pulses out of output port B6 which cause servo motor 60 to move into an unlatched position. For the 94102 servo controller motor utilized in the preferred embodiment, this modulated signal consists of a 1.8 millisecond high pulse, which is repeated every 15 milliseconds. In addition, microprocessor IC3 sets a flag in memory to indicate that the door holder is in an unlatched position. The system then repeats this process until an unlatch condition signal is no longer present at input port A3.

If, however, after the above power maintenance step, there is not an unlatch signal condition present at input port A3, different steps are taken. (A high signal may not always still be present at the output of pin 10 if IC1, even though this signal initially activates the microprocessor. This is because the signal out of pin 10 of IC1 is a pulsed signal, which lasts only a short duration. Thus, the time it takes for microprocessor IC3 to reset as described above may be longer than the pulse duration from IC1. However, microprocessor IC3 will detect the following pulse within fifty seconds and generate an unlatch signal upon such detection.) A check of the flag is made to determine whether the latch has been unlatched. If so, output port B2 is deactivated, which turns off IC2 and thereby the power to microprocessor IC3. This also automatically resets the flag. The circuit then enters standby mode as described above, with the latch unlatched, until the next unlatch condition occurs.

If the flag has not been set, then input port A2 is monitored to see if the reset button is depressed. If so, then a series of 1 millisecond pulses (each separated by a 15 millisecond period) is output from port B6, which causes servo motor 60 to move into a latched position. Thereafter, port A3 is monitored to see if an unlatch condition exists. If so, control returns to the point shown in FIG. 4. If not, the system turns off port B2 and enters standby mode.

If port A2 is not active, then the system checks the internal clock and compares it to the above-described reference time to see whether fifty seconds have elapsed since port A3 was initially activated. This check, which constitutes a timer, accounts for the fact that there is a 40 second interval between low battery condition pulses, and the first pulse may no longer be present when port A3 is checked as described above. Therefore, checking continues for a 50 second period, and if a low battery condition exists, the second pulse into port A3 will be detected. However, if 50 seconds pass without a pulse reappearing at port A3, the system resets and returns to standby mode to conserve power.

As noted above, the above components may be contained in a single housing. It will be appreciated that numerous changes may be made to the embodiment disclosed herein without departing from the spirit and scope of the invention. For example, numerous latch mechanisms for door closers are known in the art and may be employed in place of the finger/latch arm combination described above. It is also contemplated that a door closer may be integrally constructed with a door hold-open device, instead of using separate units. Further, although in the preferred embodiment the unlatch condition signal comprises a pulsed signal in which each pulse may be separated by a duration of up to 50 seconds, any other form of signal may be employed to communicate the existence of an unlatch condition. Moreover, although the signal processing means in the preferred embodiment comprises a microprocessor, the microprocessor could easily be replaced by a comparable combination of hard-wired circuitry. In the preferred embodiment, when power is initially provided to the microprocessor upon an unlatch condition, the microprocessor verifies the continued existence of the unlatch condition signal before applying an unlatching signal to the door latch. However, this verification step could easily be eliminated.

The above described preferred embodiment contains several advantages over the prior art. Most importantly, the use of an unlatch condition signal to both indicate an unlatch condition and to also turn on a power source to a microprocessor significantly reduces power consumed by the microprocessor during standby conditions. This greatly increases battery life. In addition, the microprocessor includes logic to detect smoke, low battery, test and reset conditions, as well as the logic necessary to generate modulated signals for the servo motor and to generate a signal to maintain power to the microprocessor once an unlatch condition has been detected. This construction greatly reduces the number of parts and cost of the door holder.

The use of a door holder employing a battery also provides significant advantages over conventionally powered door holders. First, the use of a motor makes constant current to the latching mechanism unnecessary as with solenoid-based systems. Second, since a large constant current is not needed, a battery may be used as a power source. This in turn makes wiring the device to a building's electrical supply unnecessary. Third, since the device is not wired to a building's electrical supply, it will not be damaged by power spikes, and the chances of incorrectly wiring of the device are eliminated. Fourth, the device will work properly if there is a power failure in the building. Fifth, if a fire occurs, only doors in the area of the fire will close, as remote doors will remain held open. Additionally, the device may be used with any other door closer.

We claim:

1. In a system for holding a door open and unlatching the held door upon occurrence of an unlatch condition, the system including door latching means, a signal processing means having data input means, data output means, and a power source means, the data output means being operatively connected to the door latching means, a method for unlatching a held-open door consisting of the steps of:

preventing the signal processing means from consuming electrical current, upon occurrence of an unlatch condition, generating an unlatch condition signal and providing electrical current to the signal processing means to power it, and transmitting an electrical unlatch signal to the door latching means.

2. The method of claim 1 further comprising the steps of:

after providing electrical current to the signal processing means to power it, determining the continued existence of the unlatch condition signal, and only transmitting the electrical unlatch signal to the door latching means if the continued existence if the unlatch condition signal is still detected after electrical current has been provided to the signal processing means.

3. The method of claim 2 further comprising the steps of:

upon generation of the unlatch condition signal, starting a timer, and if the determination of the continued existence of the unlatch condition signal by the signal processing means indicates that the unlatch condition signal does not continue to exist before expiration of a predetermined time, discontinuing provision of electrical current to the signal processing means.

4. The method of claim 1 wherein the signal processing means comprises a microprocessor.

5. The method of claim 1 wherein the electrical current is supplied by a battery.

6. The method of claim 1 wherein the door latching means comprises a servo motor.

7. The method of claim 1 wherein the unlatch condition comprises the detection of smoke.

8. The method of claim 1 wherein the unlatch condition comprises a low battery voltage.

9. The method of claim 1 wherein the unlatch condition comprises a power supply access indication.

10. The method of claim 1 wherein the signal processing means comprises a switch to enable power to itself.

11. The method of claim 1 wherein, after providing electrical current to the signal processing means to power it, such provision of electrical current is continued until cessation of the unlatch condition signal.

12. The method of claim 1 wherein the unlatch condition signal comprises a pulsed signal capable of driving a servo motor to thereby unlatch the door.

13. A door hold-open device comprising:

a door latching means, a signal processing means having data input means, data output means, and a power source means, the data output means being operatively connected to the door latching means to enable unlatching of the door latching means, switch means for selectively providing an electrical power supply to the signal processing means power source means, unlatch condition signal means connected to the signal processing means data input means and to the switch means, whereby upon generation of an unlatch condition signal, the switch means provides power to the power source means of the signal processing means.

14. The door hold-open device of claim 13 wherein the signal processing means comprises a microprocessor.

15. The door hold-open device of claim 13 wherein the switch means comprises the signal processing means.

16. The door hold-open device of claim 13 wherein the door latching means, signal processing means and unlatch condition signal means are powerable by a battery.

17. The door hold-open device of claim 16 further comprising a low battery condition signal generating means operatively connected to the data input means.

18. The door hold-open device of claim 13 further comprising a smoke detector operatively connected to the data input means.

19. The door hold-open device of claim 13 further comprising a battery access member signal generating means operatively connected to the data input means.

20. The door hold-open device of claim 13 wherein the door latching means comprises a servo motor.

21. The door hold-open device of claim 20 wherein the signal processing means comprises means for generating a modulated signal to drive the servo motor.

22. The door hold-open device of claim 13 further comprising:

timer means, means for starting the time means upon generation of an unlatch condition signal, and wherein the data output means operatively enables unlatching of the door latching means only if the signal processing means confirms continued existence of the unlatch condition within a predefined time period after the switch means has provided power to the power source means of the signal processing means.

23. The door hold-open device of claim 13 further comprising:

timer means, means for starting the timer means upon generation of an unlatch condition signal, and wherein the switch means discontinues the provision of power to the power source means of the signal processing means if the signal processing means does not confirm continued existence of the unlatch condition within a predefined time period after the switch means has provided power to the power source means of the signal processing means.

24. The door hold-open device of claim 13 wherein the data output means continues to communicate an unlatch signal to the door latching means until cessation of the unlatch condition signal at the data input means.

25. The door hold-open device of claim 13 wherein after the switch means provides power to the power source means of the signal processing means, the switch means continues to provide such power until cessation of the unlatch condition signal.

26. The door hold-open device of claim 13 wherein the data output means enables unlatching of the door latching means by a pulsed signal capable of driving a servo motor.

* * * * *